(12) United States Patent
Choi

(10) Patent No.: US 7,362,502 B2
(45) Date of Patent: Apr. 22, 2008

(54) SURFACE REFLECTION TYPE METALLIC SCREEN AND METHOD OF MANUFACTURING THE SAME

(76) Inventor: Hae-Yong Choi, Mookdong I Park Apartment #108 - 301, 385 Mook-dong, Jungryang-gu, Seoul-city (KR) 131-768

( * ) Notice: Subject to any disclaimer, the term of this patent is extended or adjusted under 35 U.S.C. 154(b) by 333 days.

(21) Appl. No.: 10/542,411

(22) PCT Filed: May 19, 2004

(86) PCT No.: PCT/KR2004/001185

§ 371 (c)(1),
(2), (4) Date: Jul. 15, 2005

(87) PCT Pub. No.: WO2004/107038

PCT Pub. Date: Dec. 9, 2004

(65) Prior Publication Data

US 2006/0040123 A1    Feb. 23, 2006

(30) Foreign Application Priority Data

May 31, 2003    (KR) ............... 10-2003-0036142

(51) Int. Cl.
G03B 21/56    (2006.01)
G03B 21/60    (2006.01)
G03F 5/00    (2006.01)
G02B 7/00    (2006.01)

(52) U.S. Cl. ............... 359/449; 359/459; 359/893; 359/896; 359/900

(58) Field of Classification Search ............... 359/449, 359/443, 459, 893, 896, 900
See application file for complete search history.

(56) References Cited

U.S. PATENT DOCUMENTS 1,997,815 A * 4/1935 Edelman ............... 359/444
4,057,323 A   11/1977 Ward, Jr.
4,317,618 A   3/1982 Murakoshi
4,380,368 A * 4/1983 Ohmata et al. ............... 359/443
5,127,722 A   7/1992 Nishitani
5,486,884 A   1/1996 De Vaan (Continued)

FOREIGN PATENT DOCUMENTS

JP    55-73040    6/1980

(Continued)

*Primary Examiner*—Diane I. Lee
*Assistant Examiner*—Magda Cruz
(74) *Attorney, Agent, or Firm*—Bacon & Thomas, PLLC

(57) ABSTRACT

A screen for displaying an image projected from a beam projector. The screen base is formed with an incombustible metal sheet having silver-white color for displaying an image projected from a light source with nature color. A polished surface is formed on the screen base by polishing the screen base, so that the surface of the screen base has predetermined reflectivity. A surface hardening treatment is implemented on the surface of the screen base using a pickling treatment or an anodizing treatment. The surface reflection type screen formed with a non-combustible metal according to the present invention is excellent in surface hardness, corrosion resistance and acid-resistance so that the screen is easily repaired and maintained. In addition, the screen does not generate poisonous gas in case of fire, and also high quality of an image is displayed on the screen.

14 Claims, 14 Drawing Sheets

U.S. PATENT DOCUMENTS 6,583,936 B1 * 6/2003 Kaminsky et al. .......... 359/619
2002/0022940 A1 * 2/2002 Chen ......................... 702/127

FOREIGN PATENT DOCUMENTS

| JP | 55073040 A | 6/1980 |
| JP | 9-34012 | 2/1997 |
| JP | 55-73040 | 2/1997 |
| JP | 09034012 A | 2/1997 |
| KR | 2001-0090983 | 4/2000 |

* cited by examiner 11  11a 11  11a

SURFACE REFLECTION TYPE METALLIC SCREEN AND METHOD OF MANUFACTURING THE SAME

TECHNICAL FIELD

The present invention relates to a projection screen for displaying an image emitted from a light source and a method of manufacturing the same. More particularly, the present invention relates to a large size screen capable of using at a place where a number of people move and gather and a method of manufacturing the same.

BACKGROUND ART

A conventional projection screen is apt to melt at high temperature because the image area of the screen is made up of inflammable material such as polyvinyl chloride (PVC), plastic, etc. In addition, the conventional screen can not be employed in closed spaces used by many people such as subways, department stores, etc. This is because in case of fire the screen melts in the closed space, thereby generating a poisonous gas which might cause the death of many people.

In a spherical screen using an aluminum thin film disclosed in Korean Patent No. 100127, the aluminum thin film should have ductility in order to form a screen into a spherical shape. As a result, the strength of the surface of the screen is decreased and the surface of the screen might be damaged during removing foreign material thereon. This durability of the aluminum thin film may be complemented by coating the surface of the aluminum thin film with material of high durability. However, the coating increases the durability of the aluminum thin film only within the limited ranges. In addition, the image sharpness of the screen is decreased because the coated film deteriorates the light transmittance, and also the spherical screen should not be used outdoors having a lot of dust. Furthermore, the screen is ignitable in case of fire because the spherical screen is composed of about 5% of aluminum thin film and about 95% of the plastic. Here, the aluminum thin film employed in the spherical screen has the thickness of less than 50 micron.

A known conventional film screen includes one side which is a scattering surface and the other side which is a reflection surface. In this case, an interference phenomenon is noticeably generated on the scattering surface of the screen so that the image sharpness of the film screen is decreased. In addition, because the major material of the film screen is plastic, it is not easy to clean the screen and in case of fire the film screen is ignitable.

Most of known conventional transmission type screens relate to transmission and scattering type screen including light-diffusion elements consisted of plastic material. In other words, the conventional screens limit the material thereof to plastic because of characteristics of use and manufacture. Hence, in case of fire the projection screens are ignitable.

As described above, in case of fire most of the conventional screens act as inflammables and toxic material. Additionally, it is not easy to remove foreign material, such as dust and others, on the surface of the screen, so the screen may not be suitable to indoors as well as outdoors in view of safety and maintenance.

DISCLOSURE OF THE INVENTION

It is a feature of the present invention to provide a screen formed with non-combustible material applicable to even closed space used by great many people such as subway or gymnasium.

It is another feature of the present invention to provide a screen with excellent surface strength, humidity resistance and corrosion resistance, so as to simply clean foreign material on the screen without dismantling it.

It is still another feature of the present invention to provide a surface reflection type screen capable of displaying an image directly on the surface thereof without coating extra material thereon or forming a scattering surface thereon.

It is still another feature of the present invention to provide a surface reflection type screen formed with non-combustible metal without hot spot and speckles, wherein the projected image is reproduced with nature color on the screen.

The screen of the present invention is formed with a metal having excellent optical and non-combustible characteristics. Here, the metal should have high ductility to form easily a plane screen, a curved screen or a spherical screen, and has silver-white color to reproduce naturally color of the projected image. In addition, the metal should be able to passivate the surface of the screen to maintain hardness of the surface thereof.

To function as a screen, the screen formed with non-combustible metal of the present invention should scatter and reflect appropriately a light emitted from a light source on the surface thereof, and should not generate speckles when the image is projected thereon. Additionally, the surface of the screen should be treated by polishing or corrosion method and so on in order to ensure left-right viewing angle.

Subsequently, the brightness of the screen is determined in accordance with the application thereof. Moreover, the shape of the screen should be one of plane, curved and spherical shape in order to remove the hotspot phenomenon generated on the screen in accordance with increase of the brightness of the screen.

To display high quality of the image on the surface of the screen, the image should be reflected on the surface thereof itself without interference of foreign material. In addition, a surface hardening treatment of enhancing durability and corrosion resistance of the screen itself should be implemented so as to protect deformation of the shape of the screen and clean stably the surface of the screen using water.

For scale-up of the manufactured screen, the screens should be combined one another and the seaming line of the coupled portion of the screens should be minimized. A surface reflection type screen formed with a non-combustible metal according to one embodiment of the present invention comprises a screen base formed with a incombustible metal sheet having silver-white color for displaying an image projected from a light source with nature color, wherein the screen base is polished so that the surface of the screen base has a predetermined reflectivity, and a surface hardening treatment is treated on the surface of the screen base. The surface of the screen according to the present invention has reflectivity of about 1 to 40 gains, and the shape of the screen is selected from plane, curved surface and spherical shape in accordance with the reflectivity of the surface of the screen in order to remove a hotspot. The screen base can be formed with an alloy sheet of iron (Fe) and chromium (Cr) or an alloy sheet of Fe, Cr and nickel (Ni); in this case a chromium trioxide ($Cr_2O_3$) film is formed on the surface of the screen base by a pickling treatment. Furthermore, the screen base can be formed with a metal sheet that is one of aluminum (Al), an alloy sheet of Al and magnesium (Mg), and an alloy sheet of Al and nickel (Ni); in this case an aluminum oxide ($Al_2O_3$) film is formed on the surface of the screen base by an anodizing treatment. The reflection surface is formed on the surface of the screen base in one direction of up-down direction or left-right direction, the scattering surface is formed on the surface thereof in the other direction, and the surface thereof is polished to form a unidirectional polishing waves on the surface thereof. The surface of the screen base can be treated by porous chromium plating and a porous part of the surface of the screen base is filled with a colored paint.

It is desirable to form holes capable of passing an air through the surface of the screen base, thereby supporting the screen from a wind when the screen is installed outdoors.

A surface reflection type screen formed with a non-combustible metal according to another embodiment of the present invention includes a screen base formed by arraying in sequence a plurality of circular metal wires. Here, the meal wires can be formed with an alloy of iron (Fe) and chromium (Cr) or an alloy sheet of Fe, Cr and nickel (Ni), and a chromium trioxide ($Cr_2O_3$) film is formed on the surface of the each metal wire by a pickling treatment A surface reflection type screen formed with a non-combustible metal according to still another embodiment of the present invention includes a screen base formed by arraying in sequence a plurality of circular metal wires. Here, the metal wires are formed with an alloy of aluminum (Al) or an alloy of Al and magnesium (Mg), and an aluminum oxide ($AlO_3$) film is formed on the surface of the screen base by an anodizing treatment.

A method of manufacturing a surface reflection type screen formed with a non-combustible metal according to one embodiment of the present invention includes forming a metal sheet with a non-combustible metal having silver-white color for displaying an image projected from a light source with nature color; forming a polished surface on the metal sheet by polishing the surface of the metal sheet, wherein the surface of the metal sheet has predetermined reflectivity; forming the metal sheet into one of plane, curved surface or spherical shape in accordance with the reflectivity of the surface of the metal sheet in order to remove a hotspot; and performing a surface hardening treatment on the surface of the processed metal sheet. The polished surface is formed by buffing, injection, etching, rolling or electrolytic polishing. The surface hardening treatment is treated by one of a pickling treatment, an anodizing treatment and a plating method in accordance with material of the metal sheet.

A method of manufacturing a surface reflection type screen formed with a non-combustible metal according to another embodiment of the present invention includes forming metal wires having circular shape; treating a surface of the metal wires using a pickling treatment or an anodizing treatment in accordance with material of the metal wires to form a film on the metal wires; and arraying in sequence the treated metal wires and combining the arrayed metal wires, and then forming the combined metal wires into one of a plane screen, a curved screen or a spherical screen.

A large screen is manufactured by combining a plurality of unit screens having predetermined size. The edge portion of the screen base (1) is bended so that the bended surface is perpendicularly polished. It is desirable that the unit screens are combined with the polished surfaces contacted one another.

As described above, the screen of the present invention is formed with non-combustible material, and so poisonous gas is not generated in case of fire. Therefore, the screen is suitable for a screen in a public space such as a subway, a school or government and public offices, etc. and applicable to a screen for advertisement in a large size space such as a large conventional hall, an underground shopping center or a department and so on.

In addition, the metal employed as the screen base has transparent and silver-white color. Thus, a projected image may be displayed on the screen with original color and an image having high contrast may be displayed on the screen.

Also, left-right viewing angle is enlarged comparing to up-down viewing angle by the unidirectional polishing waves formed on the surface of the screen base. Hence, the left-right viewing angle of the screen of the present invention is enlarged by above 2 times than that of the conventional screen, wherein the brightness of the screen of the present invention is substantially identical to that of the conventional screen. Furthermore, the image is distinctly displayed on the screen in light space.

Additionally, the surface of the screen of the present invention has great hardness and the screen is strong in change of temperature and wind pressure. Therefore, the screen may be employed in outdoor such as a playground or a roadside and so on.

In addition, the pickling treatment and the anodizing treatment are performed on the surface on which the polishing waves are formed so that the hardness of the screen is enhanced.

BRIEF DESCRIPTION OF THE DRAWINGS

The above and other features and advantages of the present invention will become readily apparent by reference to the following detailed description when considered in conjunction with the accompanying drawings wherein.

BEST MODE FOR CARRYING OUT THE INVENTION

Hereinafter, the preferred embodiments of the present invention will be explained in more detailed with reference to the accompanying drawings.

Figure 1:
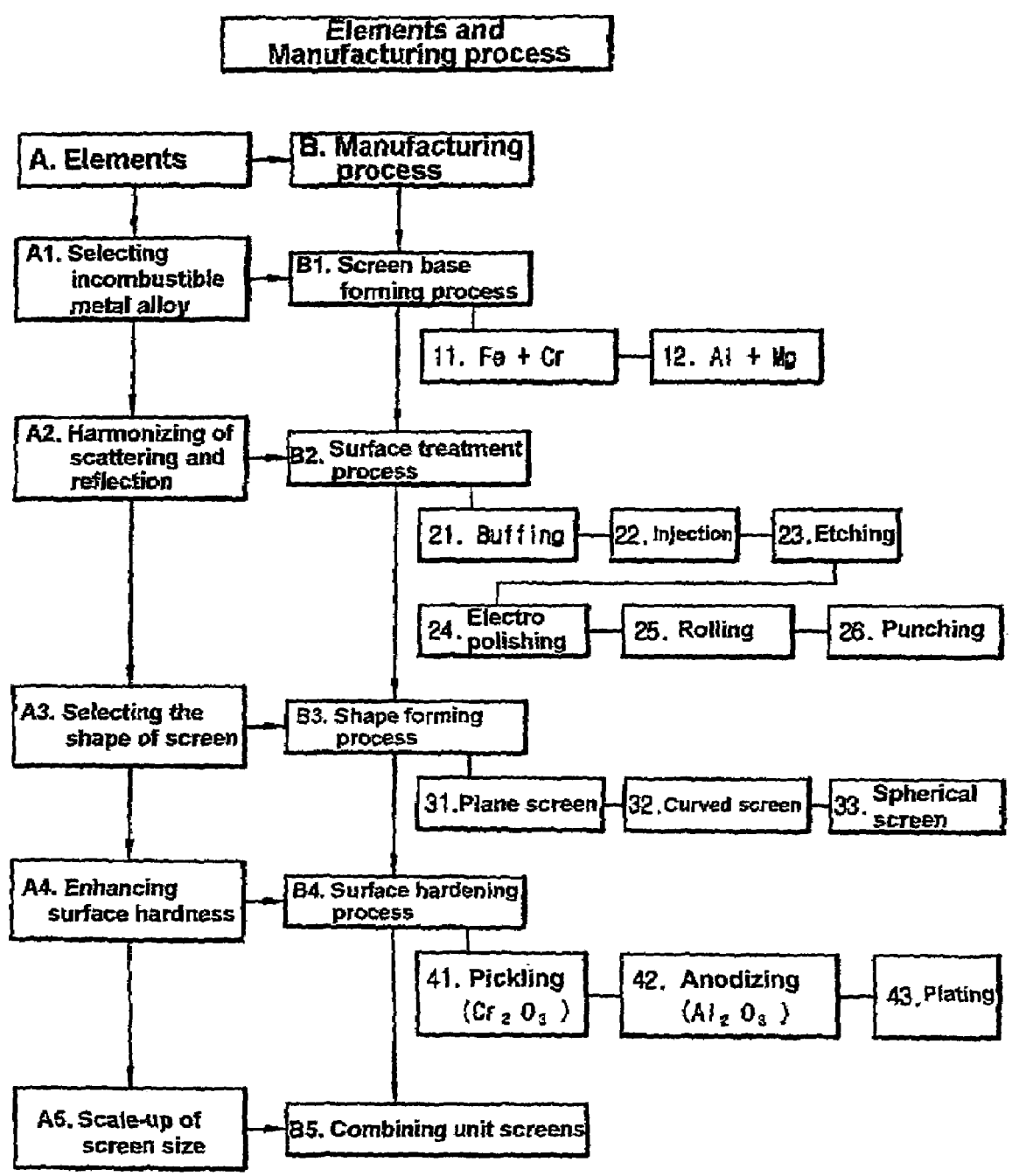
FIG. 1 is a schematic diagram illustrating major elements of the screen according to the present invention and a method of manufacturing the same.

FIG. 1 is a block diagram illustrating elements and manufacturing process of a screen according to the present invention.

As shown in FIG. 1, the present invention includes selecting a non-combustible metal alloy (A1), harmonizing of scattering and reflection (A2), selecting the shape of the screen in accordance with its applications (A3), enhancing hardness of the surface of the screen (A4) and performing scale-up of the screen (A5).

The surface reflection type screen formed with non-combustible metal according to one embodiment of the present invention is provided with an incombustible metal sheet having silver-white color, wherein the metal sheet is formed by alloying Iron (Fe) and Chromium (Cr), or Iron (Fe) and Chromium (Cr) and small amount of Nickel (Ni).

The sheet is provided with appropriate scattering surface and reflective surface through buffing, injection, etching, roller polishing, or electrolytic polishing. In addition, the sheet is provided with chromium trioxide ($Cr_2O_3$) film on the surface thereof by pickling treatment. The sheet is formed into a plane, curved or spherical shape of screen in accordance with the reflectivity of the surface of the screen so that the hotspot is removed.

Figure 2:
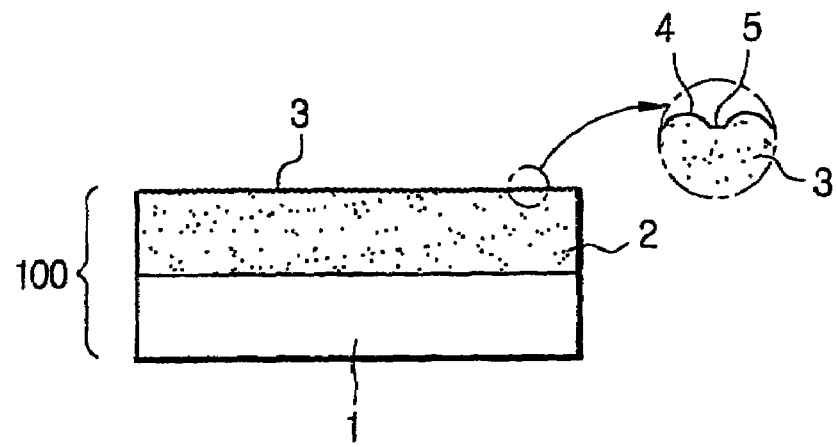
FIG. 2 is a plan view illustrating the surface of the screen according to the present invention.

The non-combustible metal having silver-white color includes alloy of Fe and Cr, preferably alloy of about 16 to 25% of Fe, Cr and about 7 to 20% of Ni. This alloy is excellent in corrosion resistance and acid-resistance. Additionally, when the pickling treatment is treated on the metal by using an oxidizing agent, the surface of the metal shown in FIG. 2 become passive so that chromium trioxide ($Cr_2O_3$) film which protects the inner of the metal from corrosion is formed. Moreover, it is profitable to the process of the shape of the screen because appropriate Ni enhances ductility and processability of the alloy. Here, the metal may be employed as material of the screen because the metal has silver-white transparent color. The metal is formed into thin film sheet. Here, the thickness of the sheet is not limited particularly, but preferably about 1 to 5 mm.

Hereinafter, a screen base (1) indicates the above metal sheet having non-combustible material.

Hereinafter, a surface treatment method (A2) for harmonizing scattering and reflection in order to provide function of the screen to the screen base (1) shown in FIG. 1 will be described.

The main function of the screen is scattering the light. The scattering function changes the traveling direction of the light projected toward the screen, scatters the changed light and stops the light at the screen so that an image can be seen on the screen at the desirable position and direction.

The reflection performs a function opposed to the scattering. The incidence angle and the reflection angle are symmetric to the normal line that is perpendicular to the reflection surface. Magnitude of the incidence angle is identical to that of the reflection angle. When the reflection surface is curved or a spherical surface, a light incident in parallel to a reflection axis is gathered at geometric focus of the reflection surface. On the contrary, an incident light projected to curved surface or spherical surface from the focus reflects in parallel to the reflection axis.

The present invention forms harmoniously the reflection surface and the scattering surface on the surface of the screen, and processes effectively the shape of the screen. As a result, the screen of the present invention may display high quality of the image thereon using the metal which is rarely employed in a conventional screen.

Figure 3A:
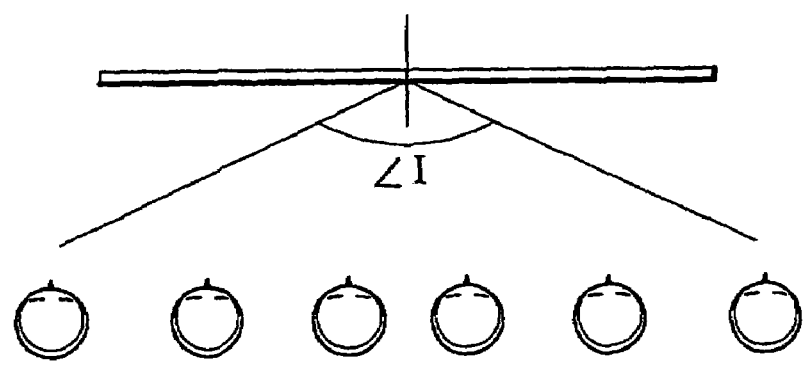
FIG. 3a is a plan view illustrating left-right viewing angle of a screen.
Figure 3B:
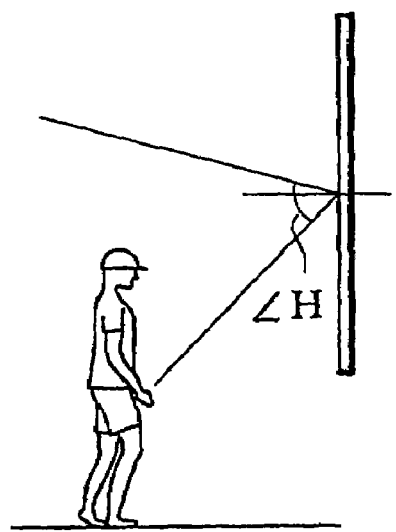
FIG. 3b is a plan view illustrating up-down viewing angle of a screen.

The viewing angle of the screen is in proportion to scattering rate, and is in inverse proportion to reflectivity. Generally, viewers see the screen at the center, and the left-right sides. Therefore, it is desirable that the screen has the wide left-right viewing angle (∠I) shown in FIG. 3A, and has an up-down viewing angle (∠H) below a required angle shown in FIG. 3B. Here, the required angle indicates an angle in which the viewers can see stably the whole image displayed on the screen. In other words, the light should be diffused in effective seeing and hearing range so as to augment the brightness of the screen.

Figure 9:
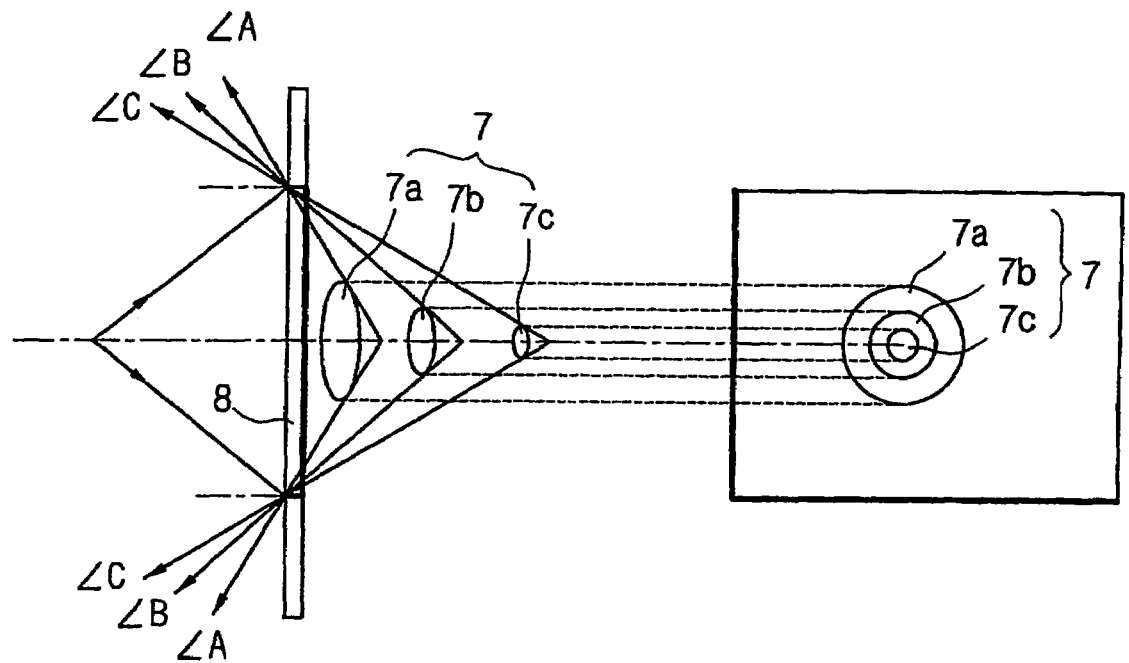
FIG. 9 is a plan view illustrating hotspot of the screen.

To display high quality of the image on the screen, the hotspot phenomenon (7) shown in FIG. 9 ought not to be generated on the screen, wherein the hotspot phenomenon (7) means a phenomenon that the brightness at a part of the whole screen is greater than that at the other parts thereof. When the hotspot phenomenon (7) is generated on the screen, only a part of the screen is seen brightly, and so the image quality of the screen is decreased. Usually, this hotspot phenomenon (7) is generated on a high gain screen of above 1.5 gains. The reflectivity is inversely proportional to the scattering rate. The generation range of the hotspot (7a, 7b and 7c) corresponds to the reflection angle in accordance with the reflectivity. In other words, the hotspot (7a) is widely generated on the screen when the reflection angle such as the angle (∠A) is wide, whereas the hotspot (7c) is narrowly generated thereon when the reflection angle such as an angle (∠C) is narrow. When the hotspot (7a, 7b and 7c) is generated on a part of the screen, the brightness of the part thereof is greater than that of the other parts thereof. Generally, the hotspot (7a, 7b and 7c) is generated on a plane screen when the plane screen has the reflectivity of above a certain level.

Figure 4:
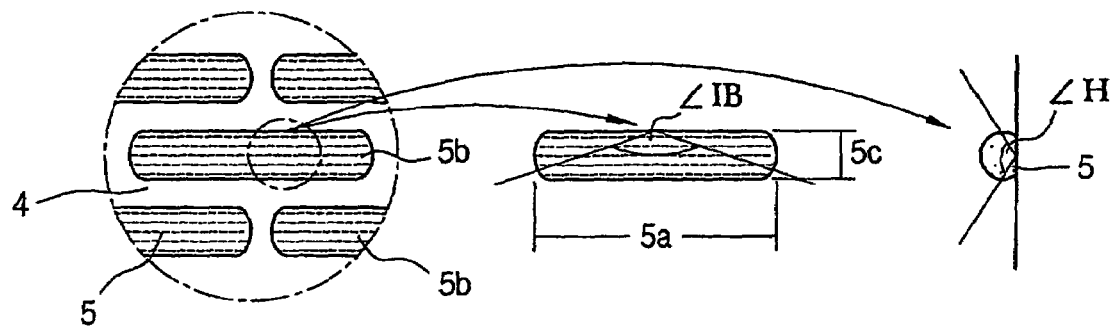
FIG. 4 is a plan view illustrating polishing waves of the screen according to the present invention.

FIG. 4 is a plan view illustrating 200 times enlarged polishing waves by a microscope, wherein the polishing waves are formed on the surface of the screen.

The unidirectional polishing waves are formed on the surface of the screen base (1), and the polishing waves (5b) as scattering lines (5a) are formed in left-right direction or up-down direction. When the polishing waves (5b) are formed in left-right direction as shown in FIG. 4, the reflection surface (4) is formed in up-down direction on the screen and the scattering surface (5) is formed in left-right direction on the screen. Here, the thickness of the polishing line (5c) is less than 1 mm, and preferably 1 to 20 μm. On the contrary, when the scattering surface (5) is formed on the surface of the screen base and a reflection line (4a) is formed by polishing waves in up-down direction, the incidence light is scattered in left-right direction and is reflected in up-down direction. In other words, when the reflectivity of the screen base (1) itself is high, the surface of the screen base (1) is polished to form the polished surface having lower reflectivity than the reflectivity of the screen base (1), wherein the polished surface includes the polishing waves (5b). Whereas, when the reflectivity of the screen base (1) is low, the surface of the screen base (1) is polished to form the polished surface having a required reflectivity.

The reflection surface (4) and the scattering surface (5) are formed on the screen base (1) as shown in FIG. 4, and so the brightness of the screen is enhanced from the reflection effect on the reflection surface (4) in up-down direction and a scattering effect by the scattering surface (5) is augmented in left-right direction. As a result, a left-right viewing angle (∠IB) is enlarged more than an up-down viewing angle. However, the polished surface of a conventional screen scatters uniformly an incident light in all directions, and thus an up-down viewing angle is identical to a left-right viewing angle (∠IA). As a result, the brightness of the image displayed on the conventional screen is lower than that of the image displayed on the screen of the present invention.

The screen base (1) formed with a non-combustible alloy according to first embodiment of the present invention performs efficiently a function of both the reflection and the scattering on the surface thereof, so the screen including the screen base (1) can display high quality of the image on the screen. This reflectivity and scattering rate correspond to roughness of the surface of the screen. Table 1 shows the relation between the grain size (#) of an abrasive material and the roughness (μ) of its surface.

TABLE 1

| grain size (#) | roughness (μ) |
| --- | --- |
| 20 | 1190~1300 |
| 50 | 310~370 |
| 80 | 210~250 |
| 250 | 62~73.5 |
| 400 | 37~44 |
| 500 | 31~37 |
| 800 | 18~22 |

TABLE 1-continued

| grain size (#) | roughness (μ) |
| --- | --- |
| 1000 | 14.5~18 |
| 2000 | 7.1~8.9 |
| 3000 | 4.7~5.9 |

KSL.6001 grain size of the abrasive material

It is desirable that the surface of the screen according to the present invention is polished to have grain size (roughness) of about 20# (1200μ) to 800# (18μ). However, it can be varied in accordance with material, size and shape of the screen. In other words, the grain size of the abrasive material is selected in the range of about 20# to 800#, but ought to be appropriately adjusted in accordance with the shape of the screen such as a plane, curved or spherical shape, etc.

The plane screen (8) is polished by using an abrasive material having the grain size of about 20# to 120#, and is polished by using an abrasive material having the grain size of low mesh in left-right direction. For example, the base of the plane screen (8) is polished by using an abrasive material having the grain size of about 180# and further polished with an abrasive material having the grain size of about 90# in the left-right direction. In this case, the brightness of the screen is substantially identical to that of the screen polished by using an abrasive material having the grain size of about 90#, but the left-right viewing angle of the screen is enlarged by 2 times compared to the up-down viewing angle thereof. In addition, when the reflection surface is formed on the whole screen base (1) with the grain size of about 120# and the polished surface is formed in left-right direction with the grain size of about 60#, the left-right viewing angle of the screen is enlarged by 2 times compared to the up-down viewing angle thereof.

It is desirable that a curved screen (9) is polished with an abrasive material having the grain size of about 60 to 300#. It is more preferable that the reflection surface is formed with the grain size of about 120# and the scattering surface is formed with the grain size of about 80#. In this case, the left-right viewing angle of the curved screen (9) is enlarged by 2 times compared to the up-down viewing angle thereof. When the shape of the screen is a curved one, the surface of the screen may be formed with the grain size up to maximum 400#

The unidirectional polishing and the polishing of the base are performed with different grain sizes so as to form easily the polishing waves in one direction. Therefore, in case the unidirectional polishing waves are easily formed on the screen base, only polishing process which forms the polishing waves may be performed without polishing the whole base of the screen. In addition, this is identically applied to followed process of polishing the surface of the screen base using a glass abrasive material injected by compressed air.

Figure 6:
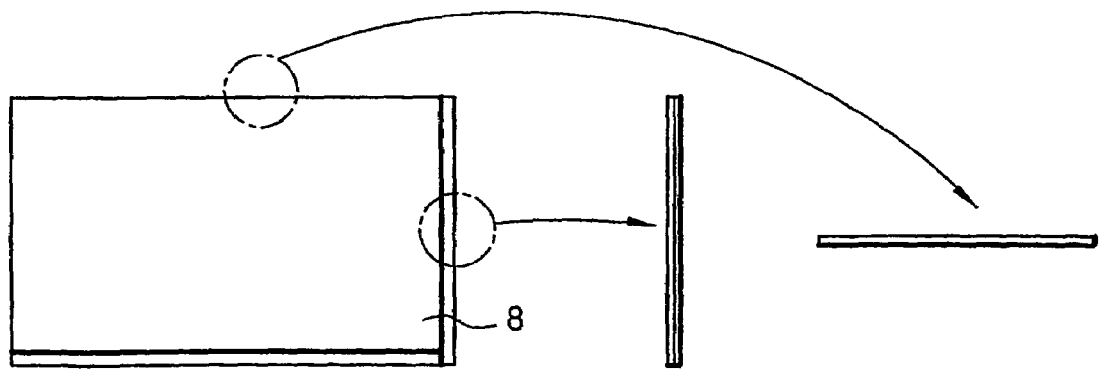
FIG. 6 is a plan view illustrating a conventional plane screen.
Figure 7:
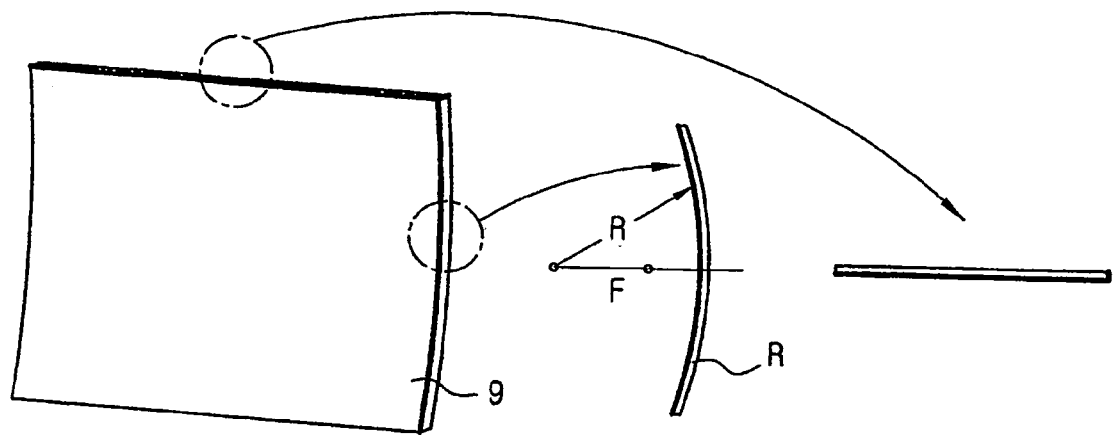
FIG. 7 is a plan view illustrating a conventional curved screen.
Figure 8:
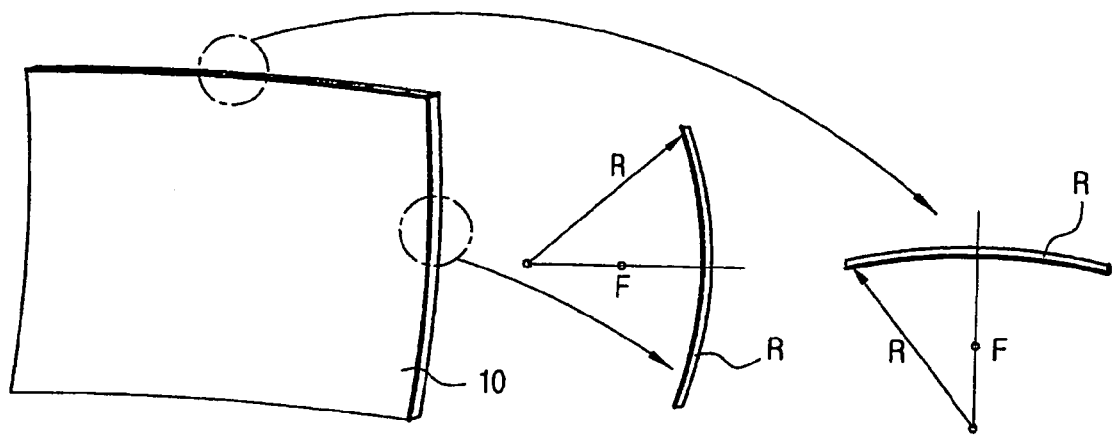
FIG. 8 is a plan view illustrating a conventional spherical screen.
Figure 25:
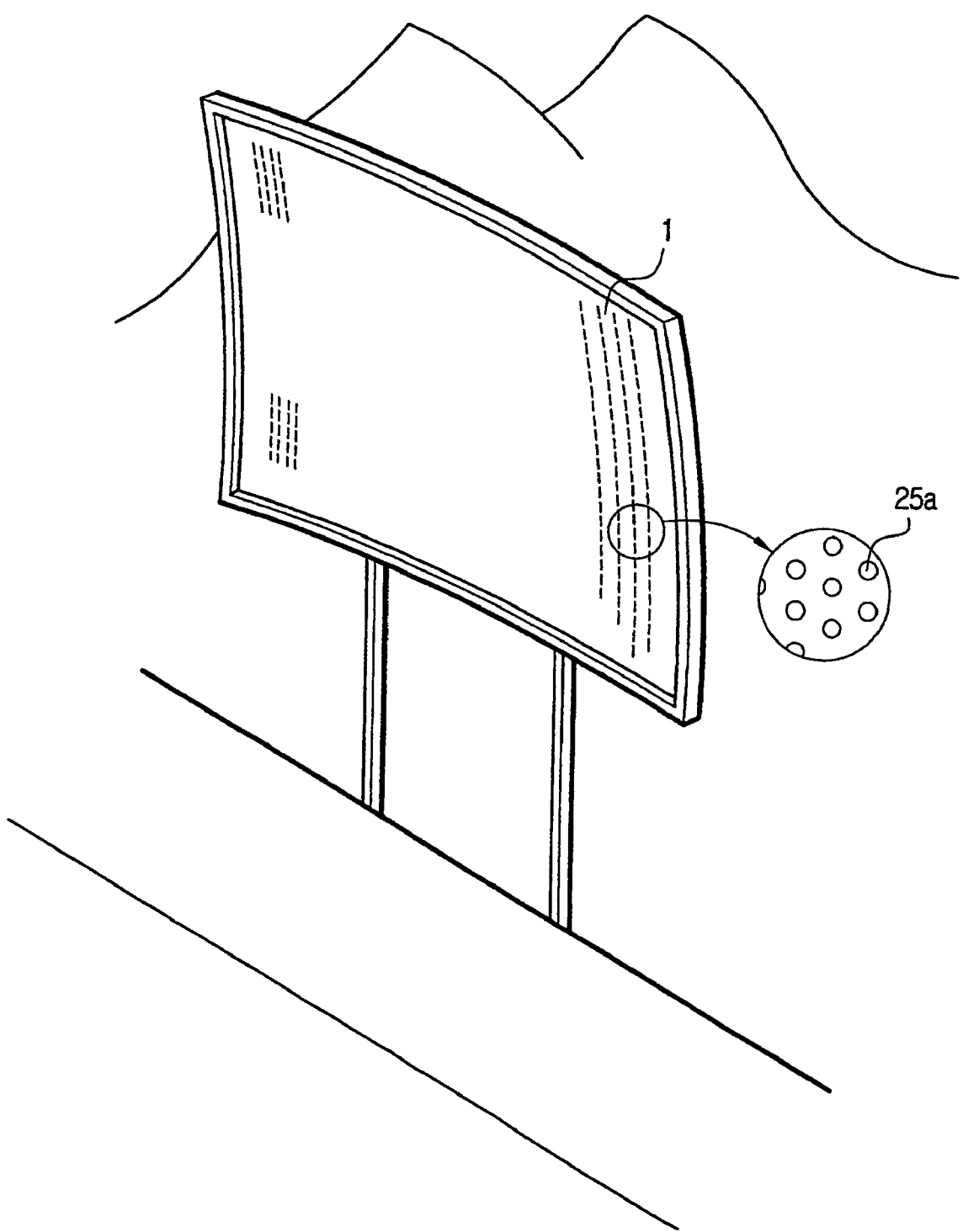
FIG. 25 is a plan view illustrating holes formed on the screen by a hole forming means according to one embodiment of the present invention.

The screen base (1) on which the polishing waves (5b) are formed is processed to one of the plane screen in FIG. 6, the curved screen in FIG. 7 and the spherical screen in FIG. 8 in accordance with the surface brightness and the purpose of the screen, wherein the curved screen is curved in the lateral or longitudinal direction. It is desirable to form a number of holes (25a) capable of passing an air flow through of the screen by a hole forming means such as a punch as shown in FIG. 25 before determining the shape of the screen, thereby supporting the screen from a wind when the screen is set to outdoors.

In the plane screen (8), the surface of the screen is formed with the gain of about 1 to 2, but an up-down reflection line is formed with the gain of about 3 to 4. In this case, the screen has the left-right viewing angle of about 180° and the up-down viewing angle of about 60 to 90° so that the up-down brightness of the screen is enhanced. Hence, the average brightness of the screen is also increased.

Figure 10:
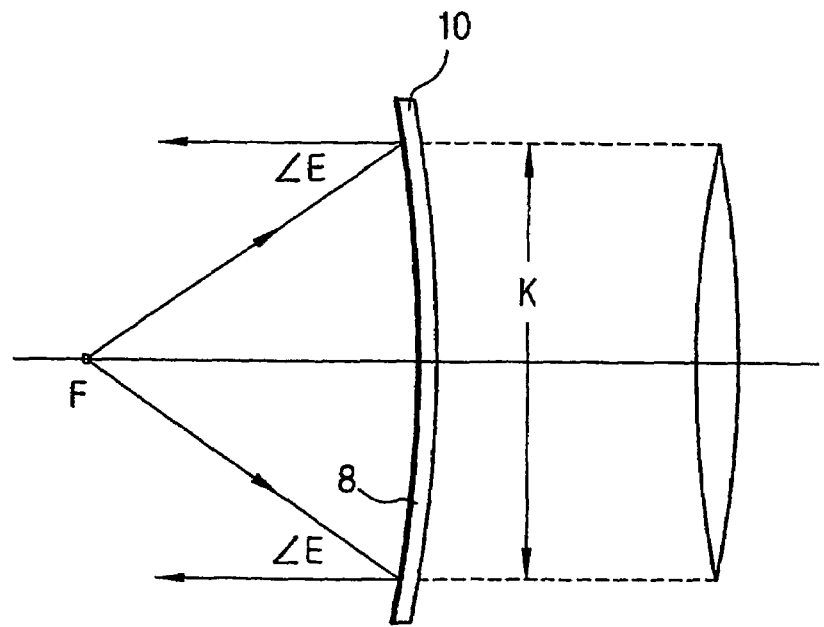
FIG. 10 is a plan view illustrating removal of the hotspot of the screen.

In the curved screen (9), the brightness of left-right surface of the screen (9) is set to the gain of about 3 to 4, and the up-down surface thereof is processed to form a curved shape. As a result, the brightness of the screen (9) is augmented up to about 15 gains. However, in the case of increasing the brightness of the screen (9) to above 15 gains, the hotspot (7) is generated on the screen (9) as shown in FIG. 9. The generation of the hotspot (7) can be prevented when the curvature (R) of the screen (9) is made to be twice the projection distance which is a distance between the screen (9) and a light source as shown in FIG. 10 with the light source being located at the focal point (F) of the screen (9). In this case, an incident light projected from the light source located at the focal point (F) is reflected in parallel to the reflection axis on the curved surface of the screen (9), and so the hotspot (7) is removed in the range of seeing and hearing which is range of reverse angle.

Figure 11:
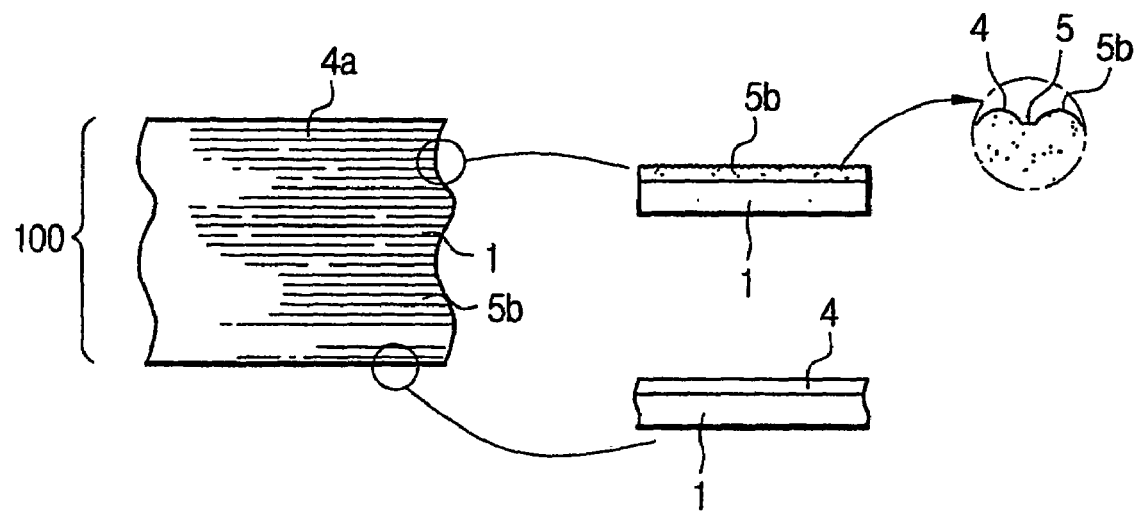
FIG. 11 is a plan view illustrating process of forming polishing waves according to the present invention.

In the spherical screen (10), the above theory applied to the curved screen (9) is applied to the up-down and the left-right of the screen (10). In this case, a light projected from the light source located at the focal point (F) of the screen (10) reflects in parallel to the reflection axis of the screen (10), and so the hotspot (7) is removed. However, the viewing angle of the screen (10) is narrowed. Therefore, it is desirable that the screen (10) has the brightness of about maximum 40 gains. As shown in FIG. 11, the polishing waves are formed on the surface of the spherical screen (10) in the left-right direction, wherein the polishing waves are scattering lines (5a). However, the reflection surface may be formed on the surface of the screen (10) in up-down direction.

Hereinafter, the surface hardening treatment method according to the first embodiment of the present invention will be described.

It is desirable that the pickling treatment is implemented for hardening the surface of the screen base (1) formed with an alloy of Fe and Cr or an alloy of Fe, Cr and Ni. The screen base (1) formed with the alloy of Fe and Cr (and Ni) reacts with an oxidizer through the pickling treatment so that a chromium trioxide ($Cr_2O_3$) film for protecting inner metal from corrosion is formed on the surface of the screen base (1), wherein the chromium trioxide ($Cr_2O_3$) film forms a passive surface. Liquid for the pickling treatment is made by mixing about 55% of nitric acid, about 12% of acid compound, about 3% of insoluble catalyst, about 9% of surface active agent, and 5% of reaction retarder, etc. When the screen base formed with the alloy of Fe and Cr (and Ni) is precipitated in the above-said liquid, the chromium trioxide ($Cr_2O_3$) film, which is passive surface, is formed on the surface of the screen base (1) in about 30 minutes from the start of the precipitation. In this case, the resultant surface of the screen base (1) is excellent in intensity, corrosion resistance and acid-resistance. Additionally, a speckle phenomenon can be removed because the surface of the screen base (1) is chemically polished during the pickling treatment process.

The surface reflection type screen formed with non-combustible metal according to the second embodiment of the present invention is formed with an aluminum non-combustible sheet having silver-white color, wherein the sheet includes aluminum metal, preferably further includes small quantity of magnesium (Mg) or Ni. In this case, the reflection surface and the scattering surface are formed on the sheet through buffing, injection, etching, roller polishing, or electrolytic polishing to display the projected image on the screen with nature color. In addition, an aluminum oxide ($Al_2O_3$) film is formed on the surface of the sheet by anodizing treatment. The screen is formed into a plane, a curved or a spherical shape in accordance with the reflectivity of the surface of the screen in order to remove the hotspot.

Hereinafter, the screen according to the second embodiment of the present invention will be further described in detail. In the following second embodiment, the same reference numbers will be used to refer to the same or like parts as those in the first embodiment. In addition, detailed descriptions of the identical elements are omitted. The screen base in the second embodiment is formed with aluminum or aluminum alloy. The aluminum is light, has high reflectivity and is excellent in corrosion resistance. Moreover, the aluminum oxide ($Al_2O_3$) film may be formed on the screen base when the surface of the aluminum is oxidized by oxygen. In this case, the film is excellent in surface hardness and corrosion resistance. Furthermore, the aluminum has silver-white color and good plasticity. To employ the aluminum as material of the screen base (1), the screen base (1) ought to be transparent colorlessness or opaque gray after the surface hardening treatment (anodizing).

Table 2 shows kinds and colors of the films formed on the screen base by anodizing. As shown in Table 2, the screen base employs about 90 to 99.8% of Al, about 1.2% of Mn or about 1% of Mg.

TABLE 2

|  | Oxalic acid (alternating current) | Sulfuric acid (direct current) | Chromic acid (direct current) |
| --- | --- | --- | --- |
| 99.8% Al | transparence | transparence | opaque ash pale |
| 99.5% Al | — | transparent colorless | opaque gray |
| 90% Al | — | — | opaque gray |
| 1.2% Mn | — | — | opaque gray |
| 1% Mg | — | transparent colorless | opaque gray |

In the second embodiment, the polishing waves (5b) are formed on the surface of the screen base of the aluminum alloy. In addition, the screen of the present invention is processed in accordance with the reflectivity of the surface of the screen so that the shape of the screen is plane, curved or spherical. Details of the second embodiment are identical to details described in the first embodiment.

In the second embodiment, the surface of the screen base (1) is hardened by using known hard anodizing. In this case, the aluminum oxide ($Al_2O_3$) film is formed on the surface of the screen base (1), thereby maximizing hardness, corrosion resistance and wear resistance, etc of the aluminum surface.

The above method forms the aluminum oxide ($Al_2O_3$) film having the thickness of about 15 to 200 μm on the surface of the screen base (1) using known Sulfuric acid process, mixed-acid process and organic acid process, and so the hardness of the surface is enhanced as shown in Table 3.

TABLE 3

| Al alloy | Hardness before the film is formed | thickness of film | Hardness after the film is formed |
| --- | --- | --- | --- |
| A 2024 | 47 Bhn | 30 μm | 450 Bhn |
| A 6061 | 30 Bhn | 50 μm | 650 Bhn |
| A 7075 | 60 Bhn | 50 μm | 500 Bhn |

As shown in Table 3, the hardness of the surface is increased by about 10 times after the anodizing treatment.

The surface of the screen is strong in corrosion resistance so that the screen may be cleaned by using water from a pressure hose. Additionally, the surface hardening process chemically polishes the surface of the screen base (1), and so the polishing waves (5b) are smoothly formed on the surface of the screen base (1). As a result, the speckle generated by the roughness of its surface is remarkably reduced, and so high quality of the image can be displayed on the screen.

The surface reflection type screen according to the third embodiment of the present invention is formed with a plurality of circular or semicircular metal wires sequentially arrayed. Here, the metal wire may be Al, an alloy of Al and Mg, an alloy of Al and Ni, an alloy of Fe and Cr, or an alloy of Fe, Cr and Ni. Moreover, the chromium trioxide ($Cr_2O_3$) film or the aluminum oxide ($Al_2O_3$) film is formed on the surface of the metal wire by the pickling treatment or the anodizing treatment. The surface of each wire functions as a reflection surface, and a curved surface between wires functions as a scattering surface.

Hereinafter, the screen according to the third embodiment will be further described in detail. In the following third embodiment, the same reference numbers will be used to refer to the same or like parts as those in the first or second embodiment. In addition, detailed descriptions of the identical elements are omitted.

Figure 21:
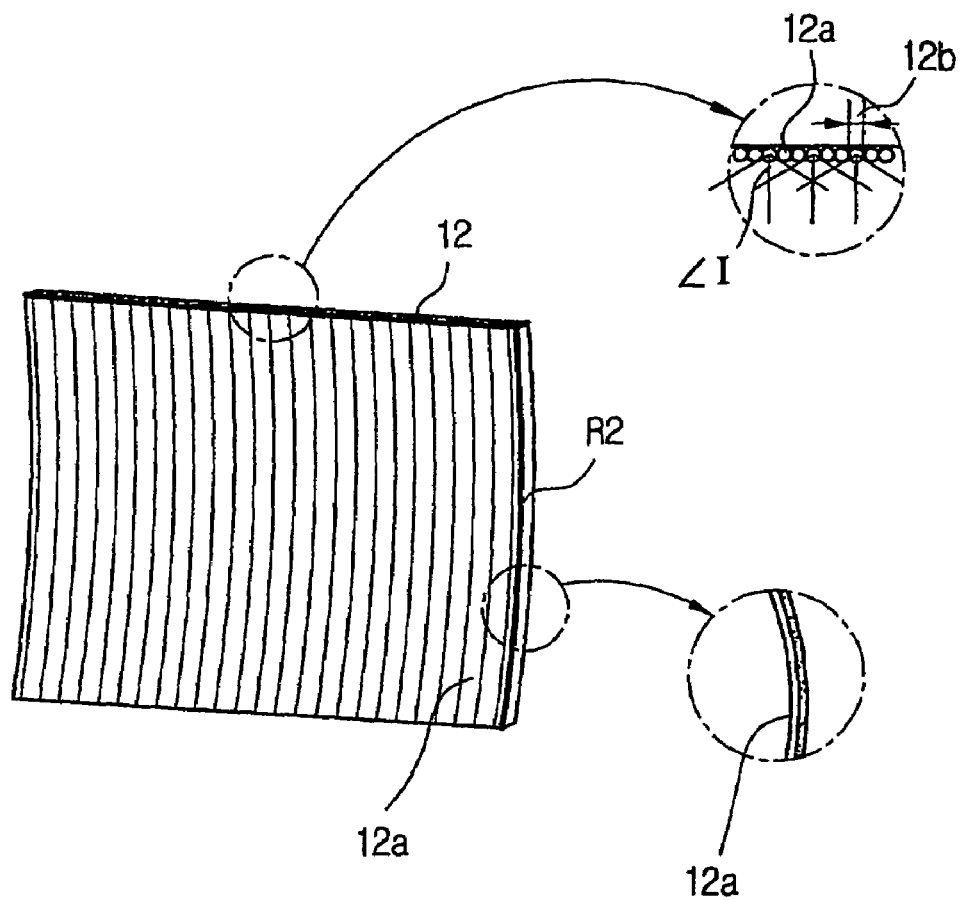
FIG. 21 is a plan view illustrating process of forming the screen according to third embodiment of the present invention.

The screen according to third embodiment of the present invention includes a screen base formed with a plurality of metal wires (12a) sequentially arrayed as shown in FIG. 21 instead of the metal thin film sheet in the first or second embodiment. Here, the surface of each metal wire (12a) functions as a reflection surface, and a curved surface between wires functions as the scattering surface. The material of the metal wire (12a) may be selected from the non-combustible metals employed in the first or second embodiment. It is desirable that the metal wire (12a) has the diameter of about 0.1 to 2 mm, and more desirably about 5 mm.

The pickling treatment or the anodizing treatment is treated on the metal wire (12a) in accordance with the selected non-combustible metal, and so a chrome oxide ($Cr_2O_3$) film or the aluminum oxide ($Al_2O_3$) film is formed on the surface of the metal wire (12a). On the contrary to the first and second embodiments, the surface hardening treatment in the third embodiment is implemented to the metal wires (12a) before forming the shape of the screen with combining the metal wires (12a).

The screen (12) formed with the metal wires (12a) according to the third embodiment is particularly applicable to the curved surface screen. The left-right viewing angle of the screen is enlarged by a curved surface (R1) of the each metal wire (12a) formed on the surface of the screen, and the hot-spot (7) is removed by up-down curved surface (R2) of the screen. In addition, the surface of the screen is protected by the oxide film of the surface of the metal wire (12a) so that the screen has excellent durability and corrosion resistance. An image projected from a light source is reflected on the surface of the metal wire (12a), and so the screen has a surface reflecting effect.

Hereinafter, the process of manufacturing the surface reflection type screen formed with non-combustible metal of the present invention will be explained with reference to the accompanying drawings.

Figure 14:
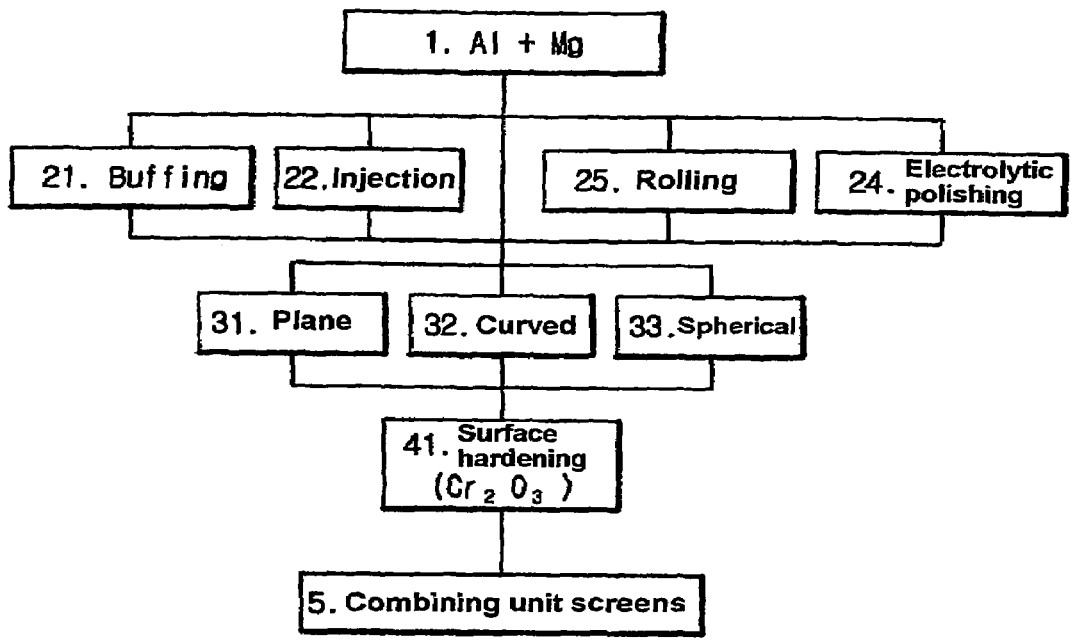
FIG. 14 is a flowchart illustrating process of manufacturing a screen according to first embodiment of the present invention.
Figure 15:
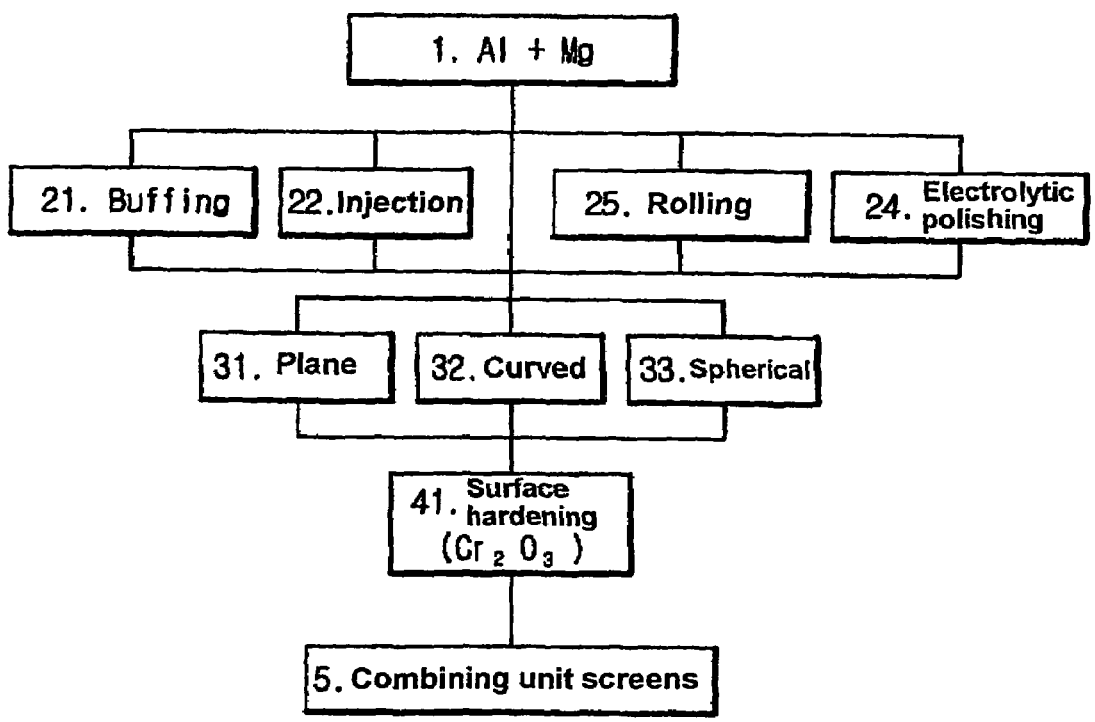
FIG. 15 is a flowchart illustrating process of manufacturing a screen according to second embodiment of the present invention.

Firstly, process of manufacturing the screen according to the first and second embodiments will be described with reference to FIGS. 14 and 15.

The thin film sheet for the screen base (1) is manufactured using a non-combustible metal alloy.

Subsequently, the reflection surface and the scattering surface are formed on the surface of the thin film sheet using buffing, injection, etching and rolling. In this case, electrolytic polishing may be performed as assistant process.

Hereinafter, the methods of treating the surface of the screen will be described in more detail.

Figure 16:
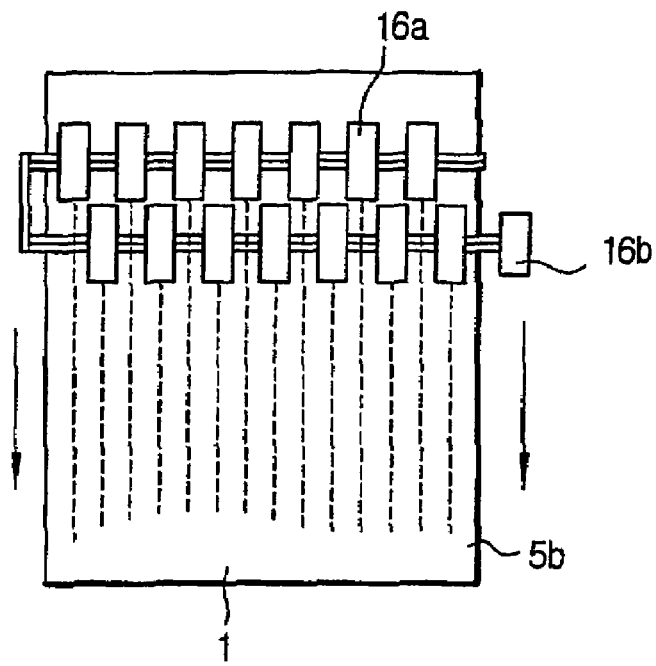
FIG. 16 is a plan view illustrating polishing method according to one embodiment of the present invention.

As shown in FIG. 16, the buffing polishing (21) indicates a method of treating the surface of the screen base (1) with rotating a plurality of buffing devices (16a) of which abrasive material is formed on the surfaces, thereby forming the polishing waves (5b) on the screen base (1) in the left-right direction, wherein the screen base (1) is being moved in back and forth during the buffing polishing (21) and the buffing devices (16a) are rotated by a motor (16b).

Figure 17:
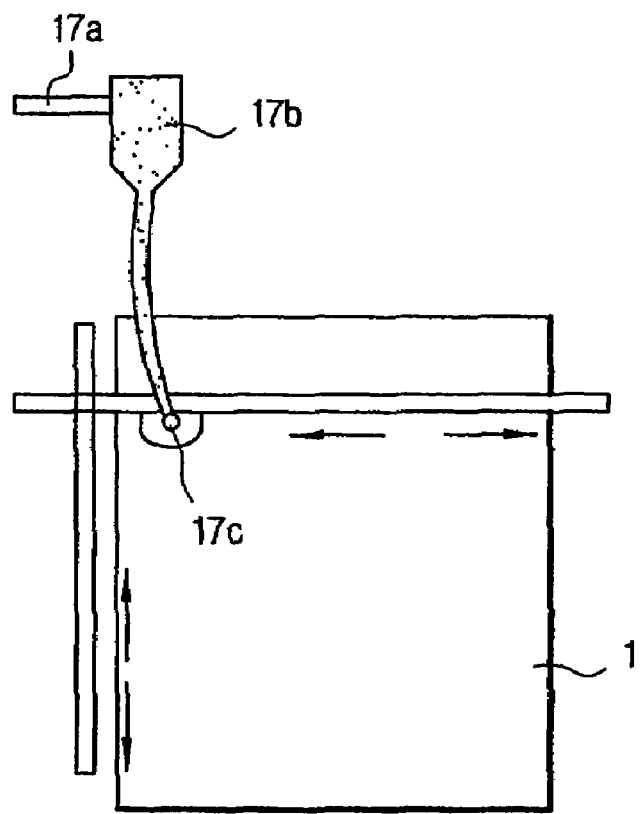
FIG. 17 is a plan view illustrating injection method according to one embodiment of the present invention.
Figure 18:
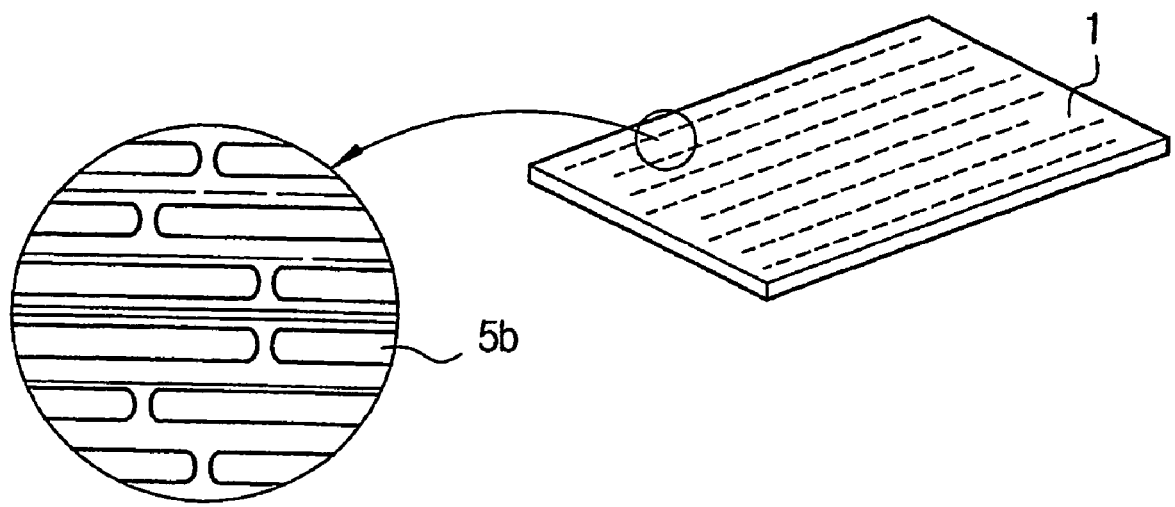
FIG. 18 is a plan view illustrating the surface of the screen by the injection method according to one embodiment of the present invention.

As shown in FIG. 17, the injection polishing (22) is a method of injecting abrasive material (17b) filled with a certain grain size on the surface of the screen base (1) using compressed air (17a). Here, the injection polishing (22) forms the polishing waves (5b) shown in FIG. 18 on the screen base (1) with adjusting the moving velocity of the screen base (1) and a nozzle (17c), wherein the screen base (1) is moved in back and forth, and the nozzle (17c) is moved in left and right during the injection polishing (22).

Figure 19:
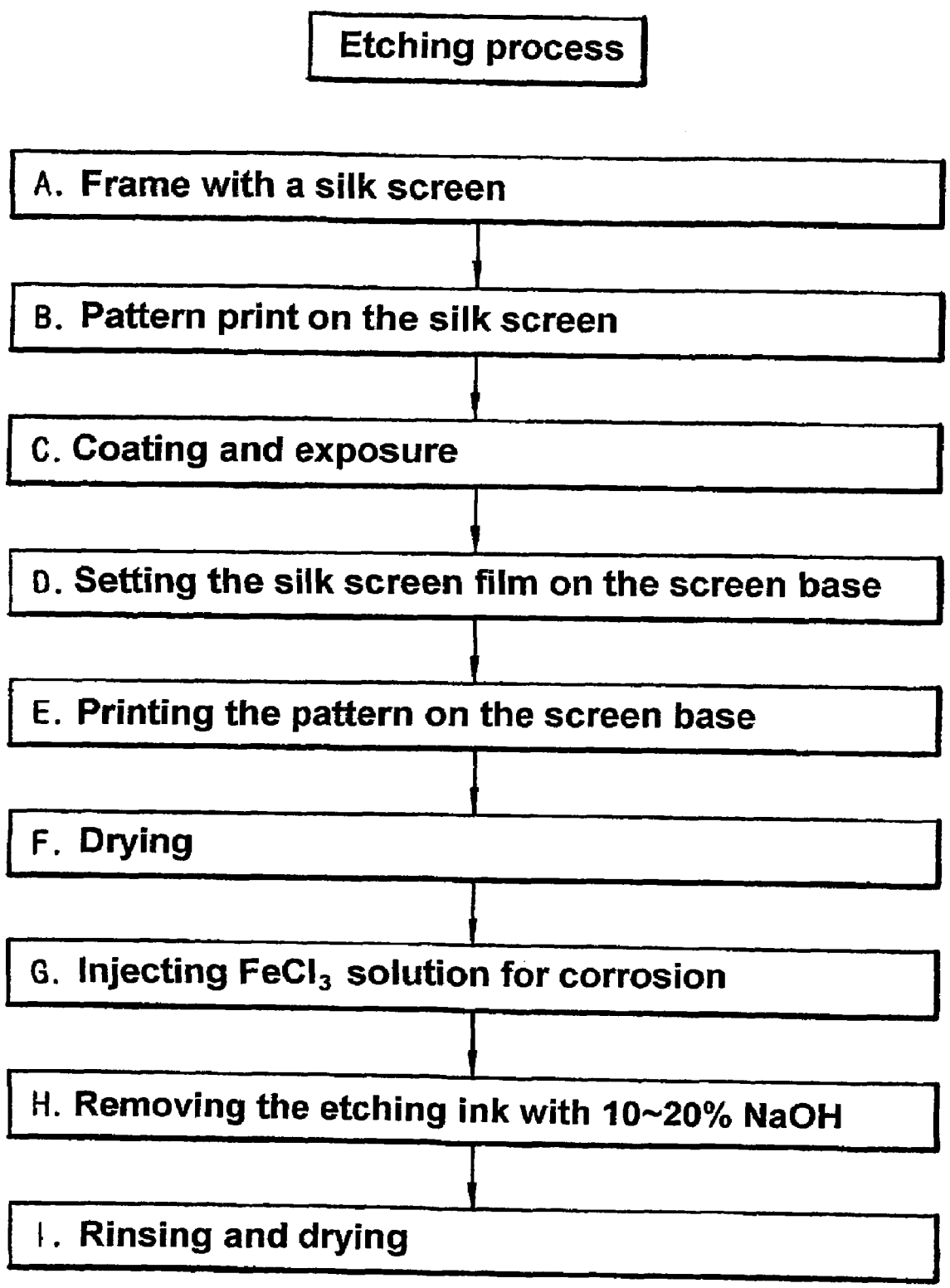
FIG. 19 is a flowchart illustrating etching process according to one embodiment of the present invention.

The etching treatment (23) is a method of corroding the upper surface of the screen base (1) to form the scattering surface and the reflection surface. The process of the etching treatment (23) is shown in detail in FIG. 19.

In step A, a frame with a silk screen stretched over it is made.

In step B, a pattern is formed on the surface of the silk screen.

In step C, a photosensitive material is coated on the silk screen, and then the silk screen and the photosensitive material are exposed to ultra-violet light so as to form a film.

In step D, the silk screen film is set on the screen base (1).

In step E, the pattern is printed on the screen base (1) by an etching ink, and then the screen base (1) is dried in a drying furnace at the temperature of about 100° C. for about 20 to 40 minutes.

In step G, the screen base (1) is corroded by injecting $FeCl_3$ solution of 40° C. for about 2 to 4 minutes.

In step H, the etching ink is removed from the screen base (1) by using 10 to 20% of NaOH solution.

In step I, the screen is rinsed and then is dried. As a result, the same the surface as the polished surface formed by the buffing or the injection is formed on the surface of the screen base (1). In this case, when a photosensitive surface is formed with the same shape as the polishing waves (5b), the scattering surface and the reflection surface may be formed on the screen base as shown in FIG. 4 at a time. According to the above etching process, the surface polishing and the surface hardening of the screen can be performed on the screen at a time.

Figure 22:
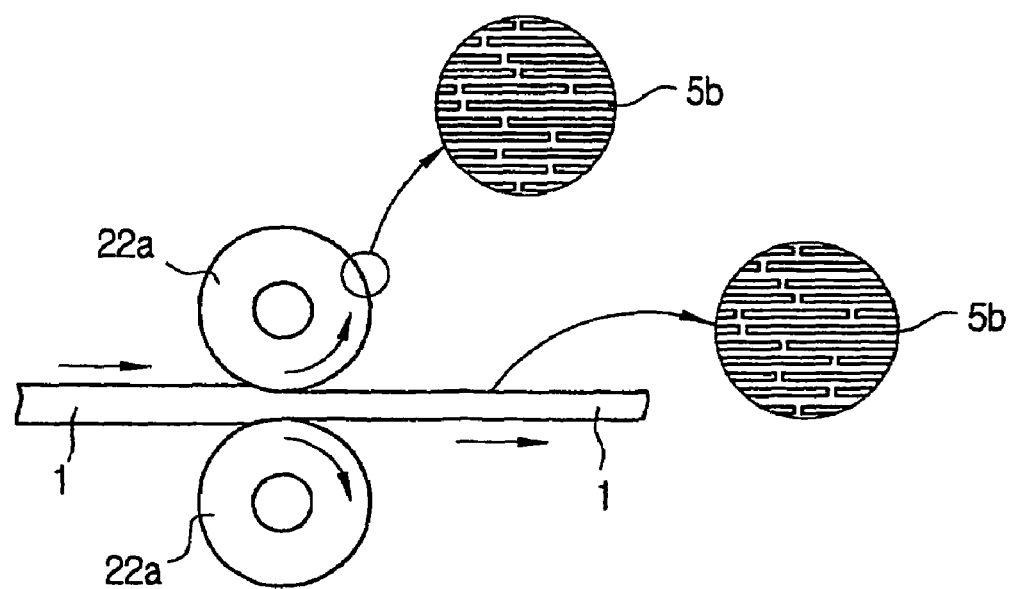
FIG. 22 is a plan view illustrating rolling process according to one embodiment of the present invention.

The rolling process (25) means a process of carving horizontal polishing waves (5b) on the surface of rollers (22a), inserting the screen base (1) between the carved rollers (22a), and then transcribing the polishing waves (5b) to the surface of the screen base (1) as shown in FIG. 22, wherein the rollers (22a) are manufactured with a metal having high intensity.

When the electrolytic polishing as an assistant process (24) is further performed besides the buffing, injection polishing, etching and rolling, a more excellent abrasive surface is formed on the screen base (1).

For example, in the process of treating the screen base (1) made of an alloy of Fe and Cr with electrolytic polishing, more excellent polished surface is formed on the screen base (1) when a small quantity of sulphuric acid, chromic acid, dichromate, acetic acid and glycerin are added to about 65 to 90% of phosphoric acid, and a voltage of about 5 to 25 V is applied with current density of about 30 to 500 A/dm$^2$ for about 1 to 5 minutes at temperature of about normal temperature to 125° C.

For another example, in process of treating the screen base (1) made of an aluminum alloy with electrolytic polishing, the surface of the screen base (1) slowly melts so that polishing effect by metal ions is facilitated when acetic acid, chromic acid and ethylene glycol are added to about 40 to 80% of phosphoric acid and about 5 to 50% of hydrocyanic acid and a voltage of about 5 to 30V is applied for about 1 to 10 minutes at temperature of about 50 to 90° C.

Figure 23:
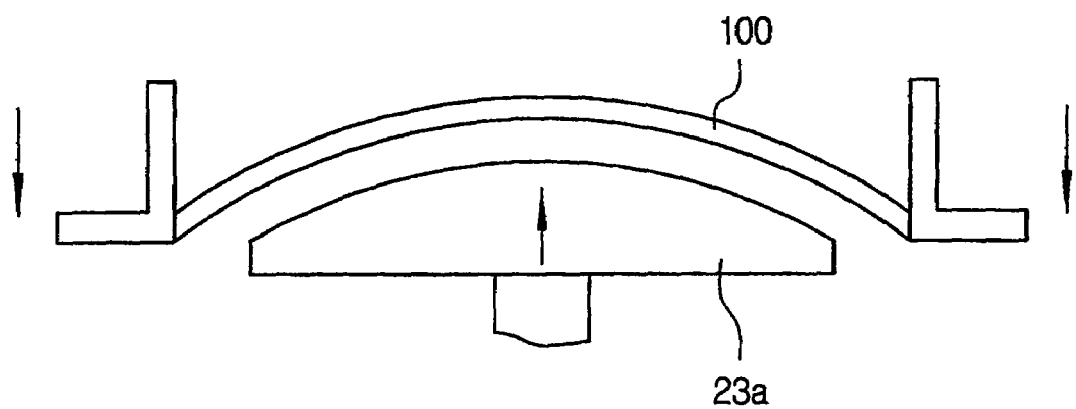
FIG. 23 is a plan view illustrating conventional process of forming spherical shape of the screen.

As shown in FIG. 25, it is desirable to form the holes (25a) capable of passing an air flow through the screen at the time between the polishing process and the followed process of forming the shape of the screen. The holes (25a) help the screen to be stably set outdoors. As shown in FIG. 23, a method of forming a curved or spherical screen uses known pressurization process using press metallic pattern (23a) and process of forming spherical surface using water pressure.

The pickling treatment and the anodizing treatment for the surface hardening are the same as those described relating to the first and second embodiments.

Hereinafter, a plating method will be described.

Figure 20A:
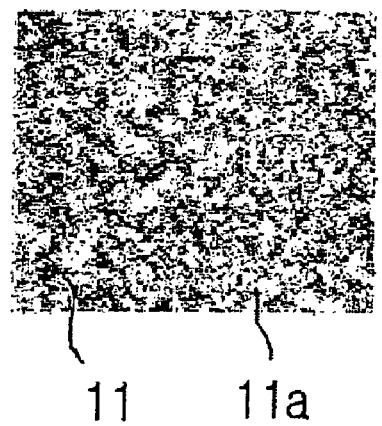
FIG. 20a is a plan view illustrating chromium film of the surface of the screen according to first embodiment of the present invention.
Figure 20B:
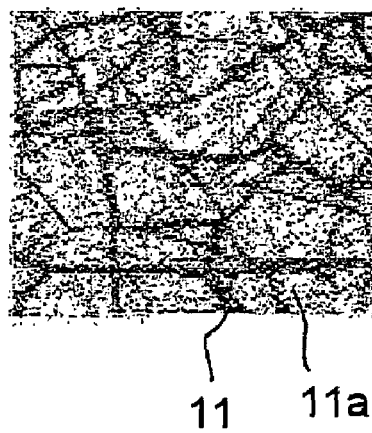
FIG. 20b is a plan view illustrating chromium film of the surface of the screen according to second embodiment of the present invention.
Figure 20C:
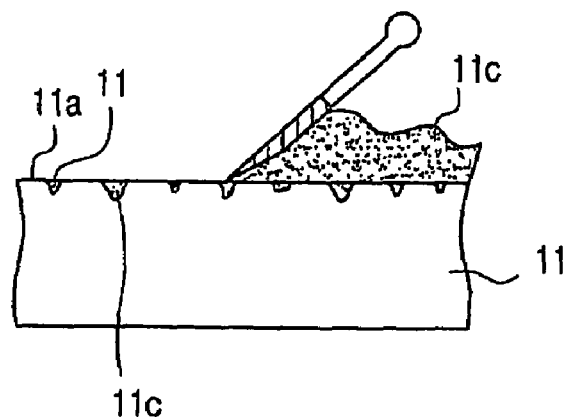
FIG. 20c is a plan view illustrating process of forming the chromium film on the surface of the screen according to one embodiment of the present invention.

Referring to FIGS. 20A, 20B and 20C, the screen base (1) is processed so that the shape of the screen base is plane, curved or spherical, and then porous chromium plating is implemented on the surface of the screen base (1) on which the pickling treatment or the anodizing treatment is treated. It is desirable that the porous chromium plating is implemented under the condition of chromic acid of about 250 g/l and chromic acid: sulfuric acid=100:1 at about 50° C., or under the condition of chromic acid of about 250 g/l and chromic acid: sulfuric acid=115:1 at about 60° C., and the porosity rate of the surface of the screen base (1) is about 25 to 40%. The surface of the screen base (1) after the plating is shown in FIG. 20A. Here, this porous chromium surface has excellent abrasion resistance. Subsequently, a porous part (11) of the surface of the screen base (1) is filled with a white paint (11c) composed of flame proof material such as urethane and others. In the screen base (1), the metal screen having excellent contrast is generated because the chromium plating surface having blackish-gray color functions as the reflection surface (11a) and the porous part (11) filled with colored paint functions as the scattering surface.

The present invention may use a lusterless nickel plating method instead of the porous chromium plating method. The surface treated with nickel plating has low discoloration, a good hardness, and high anticorrosive power. In the present invention, it is desirable to implement semi-luster nickel plating as the nickel plating, and more preferably lusterless nickel plating. It is desirable that the lusterless nickel plating is implemented under the condition of 150 to 200 g/l of nickel sulfuric acid, about 5.6 to 6.2 PH, about 15 g/l of ammonium chloride, cathode current density of about 0.5 to 11.1 c/m$^2$ and 15 g/l of boric acid at temperature of about 20 to 35° C.

Hereinafter, the method of manufacturing the screen (12) with the metal wires (12a) according to third embodiment of the present invention will be described.

Elements in the third embodiment are the same as those in the first and second embodiments except in that the screen (12) as shown in FIG. 21 employs circular wires as a material for the screen base (1).

Metal wires (12a) having circular shapes are manufactured by using a known art. Here, the material of the metal wires (12a) employs the metals in the first or second embodiment. Subsequently, the pickling treatment and the anodizing treatment are implemented on the metal wires (12a) in accordance with the employed metal so that the oxide film is formed on the surface of the metal wires (12a). The a plurality of metal wires (12a) having the treated surface are arrayed and combined in accordance with the size of the screen, and then are processed so that the shape of the screen is plane or curved. The screen (12) in the third embodiment substitutes the polishing waves (5b) in the first and second embodiments with a wire grain (12b) formed with overlapped metal wires (12a). Thus, the surface polishing process in the first or second embodiment may be omitted.

The surface of the metal wires (12a) functions as the reflection surface (4), and the wire grain (12b) formed with overlapped metal wire (12a) in left-right direction functions as the scattering surface (5).

The screen of the present invention ought to have size of about 150 to 400" to be applicable in the space used by many people such as a department store, a convention center and so on. In other words, the scale-up of the screen is required for a large screen having size of about 150 to 400".The screen according to the present invention does not have limitation for manufacturing the large screen in view of material characteristics. However, it is desirable to combine the unit screens according to the present invention at a locale for the convenience of conveyance, thereby manufacturing the above large screen.

Hereinafter, a method of manufacturing the large screen combining the unit screens will be described.

Figure 24:
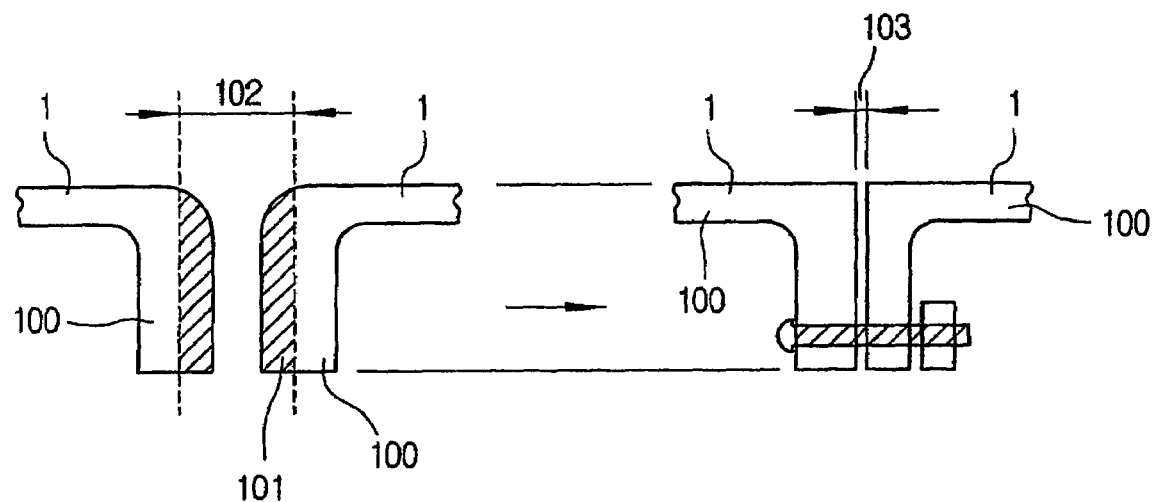
FIG. 24 is a plan view illustrating connecting method of the screen according to one embodiment of the present invention.

To produce the large screen by combining the unit screens at the locale, each of the unit screens ought to be combined one another as shown in FIG. 24, and the seaming lines of the combined portion of the screens should be minimized. Firstly, as shown in FIG. 24, the edge portion of each unit screen is bended so that each bended surface is perpendicularly polished. Subsequently, the polished surfaces (101) are combined by using a fixing tool while the polished surfaces (100) are contacted one another. In this case, the seaming lines (103) of the combined portion polished are greatly narrowed compared to the seaming lines (102) of the combined portion which is not polished because the perpendicular polished surfaces (101) are combined while the polished surfaces (101) are contacted one another. Additionally, the screen of the present invention may be produced as a unit screen having predetermined size. As a result, it is convenient to convey the unit screens to the locale, and manufacture the large screen by combining the unit screens one another.

According to experiments, It is found that the surface reflection type screen formed with non-combustible metal according to the present invention do not generate poisonous gas even at the temperature of about 1000° C. In the experiment, a conventional roll screen, a conventional plastic screen and the screen of the present invention were set in a space of 6 m×6 m×3 m, and then burning papers were put under about 1 m from each screen. The conventional roll screen caught fire just in about 10 seconds and generated poisonous gas in the space. The plastic conventional screen caught fire later than the conventional roll screen, but generated a great quantity of poisonous gas earlier than the conventional roll screen. Whereas, the screen of the present invention neither caught fire, nor generated poisonous gas. Furthermore, the shape deformation did not occur.

In another experiment, the conventional roll screen and the screen of the present invention having size of about 200" were set for above about 6 months. In this case, the roll screen deformed in shape because the roll screen did not withstand the weight thereof itself. In addition, dust lay on the surface of the conventional screen at the thickness of about 1 mm, and it was tried to clean its surface using water from a high pressure water hose. As a result, the surface of the screen was damaged from the cleaning. Whereas, the screen of the present invention did not deform in shape, and also its surface was not damaged from the cleaning.

In still another experiment, constant temperature and humidity experiment was implemented with samples from the conventional roll screen, the conventional silver foil plastic screen and the screen of the present invention under temperature of about 80° C. and humidity of about 80%, wherein each of the samples has size of 30 cm×30 cm. In this case, the samples from the conventional screens were greatly deformed in shape. Particularly, in case of the sample from the roll screen, glass beads with which the surface of the roll screen is formed were separated from the surface thereof. Additionally, in case of the sample from the silver foil plastic screen, it was twisted so that the flatness of the surface thereof was severely changed. Whereas, in case of the sample from the screen of the present invention, the surface thereof was not corroded in the experiment and the flatness of the surface thereof was not changed. Therefore, the screen of the present invention may be applicable outdoors where there are a lot of dust and great temperature changes.

Hereinafter, the viewing angle will be described.

PLC-XT15K projector (manufactured by Sanyo cooperation in Japanese) illuminated the sample from the screen of the present invention with a predetermined intensity .of illumination, and brightness was measured by a BM-7 luminance meter (manufactured by Topcon cooperation in Japanese). The viewing angle was measured in the left-right direction on the basis of the reflectivity of the center of the sample. Here, the viewing angle indicates the range where the brightness is up to 50% of brightness of the center of the screen.

Figure 5:
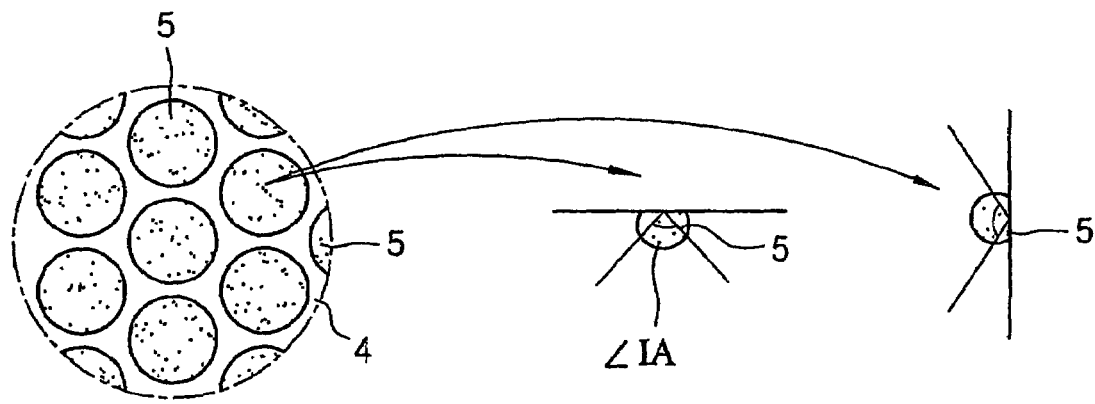
FIG. 5 is a plan view illustrating polished surface of a conventional screen.

For the screen of the conventional invention, the up-down viewing angle and the left-right angle of the screen were measured, wherein the screen was uniformly polished with the abrasive material having the grain size of about 80 to 120# as shown in FIG. 5. In the experiment, the up-down viewing angle and the left-right angle of were measured to be identically about 30°.

For the screen of the present invention, the viewing angle was measured, wherein the polishing waves (5b) were formed on the surface in only left-right direction using the abrasive material having the grain size of about 80 to 120#. In this case, the up-down viewing angle and the left-right viewing angle of the screen were measured to be about 30° and 60° respectively. In other words, the left-right viewing angle according to the present invention was twice enlarged compared to that of the conventional invention.

Objection of selecting the shape of a screen is to remove the hotspot phenomenon in accordance with the brightness of the surface of the screen and the increase of the brightness. When the polishing waves are formed on the plane screen (8) in FIG. 6 using the abrasive material having grain size of about 60 to 80#, the up-down viewing angle of about 90° and the left-right viewing angle of about 180° are formed, and so the hotspot phenomenon is not generated. The screen has the brightness of about 1 gain in left-right direction, and brightness of about 2 gains in up-down direction. In other words, the average brightness of the screen is about 1.5 gains.

In the curved screen (9) shown in FIG. 7, the polishing waves (5b) are formed on the screen base (1) by unidirectional polishing. For example, the screen base is polished with the abrasive material having the grain size of about 60 to 80# in the left-right direction, and is polished with the abrasive material having the grain size of about 120#. In this case, the reflectivity of the screen in left-right direction is about 2 to 3 gains, the reflectivity thereof in up-down direction is about 4 to 6 gains, and thus the average reflectivity of the screen is about 3 to 5 gains, wherein the screen is plane in left-right direction. Therefore, the hotspot (7) is not generated in the left-right direction, but is remarkable in up-down direction. When the screen is bended in the up-down direction, the hotspot (7) is removed from the screen, and so the screen has uniform brightness in all directions. On the other hand, when the hotspot (7) is remarkable in left-right direction, the screen is bended in left-right direction.

In the spherical screen (10) shown in FIG. 8, the screen (10) itself has a spherical shape. Therefore, when the position of the focal point (F) of the curvature (R) is identical to the projection length of the projector, the hotspot (7) is not generated irrespective of the reflectivity of the screen (10) and so the screen (10) has uniform brightness. However, the viewing angle of the screen gets very narrow when the brightness thereof is above 40 gains, and thus it is desirable not to increase the brightness of the screen (10) above 40 gains.

The shape of the screen of the present invention may be selected without any particular limit. However, it is desirable that the plane screen has about 1 to 3 gains, the curved screen has about 3 to 10 gains, and the spherical screen has about 10 to 40 gains.

Hereinafter, the effect in accordance with the pickling treatment (41) for the surface hardening will be described.

When the surface of an alloy of Fe and Cr is submersed in the nitrogen oxide solution or is rinsed by the nitrogen oxide solution, the chromium trioxide ($Cr_2O_3$) film is formed on the surface thereof. In other words, Cr included in the alloy of Fe and Cr forms the oxide film for protecting the inside metal of the screen, and passivates the surface of Fe. Additionally, the original color of Cr is transparent silver color, and thus the screen may function as a screen.

Figure 12:
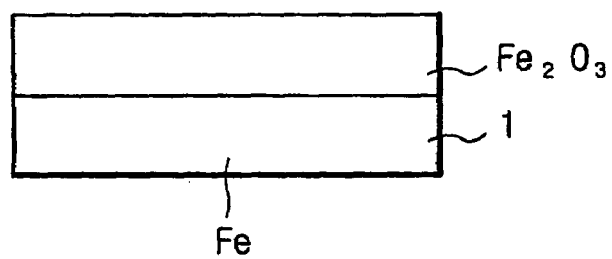
FIG. 12 is a plan view illustrating a conventional metal screen.
Figure 13:
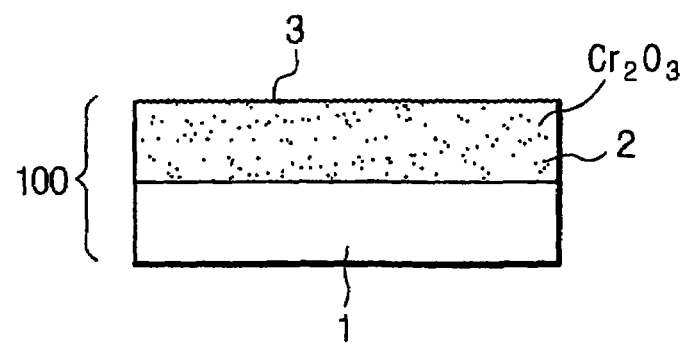
FIG. 13 is a plan view illustrating a screen having a surface on which a passive film is formed.

When the alloy is submersed in the nitrogen oxide solution for about 30 minutes, the chromium trioxide ($Cr_2O_3$) film having thickness of about 20 to 3 μm is formed on its surface. As shown in FIG. 12, the surface of conventional carbon steel reacts with outside oxygen, thereby is easily corroded. Whereas, the chromium trioxide ($Cr_2O_3$) film is formed on the surface of an alloy of Fe and Cr by the pickling treatment as shown in FIG. 13, so that the surface thereof has excellent corrosion resistance.

Hereinafter, the effect in accordance with the anodizing treatment (42) for the surface hardening will be described.

When hard anodizing treatment is implemented on an alloy of Al (or Al and Mg), the aluminum oxide ($Al_2O_3$) film having thickness of about 60 to 65 μm is formed on the surface of the alloy. However, the oxide thickness may be adjusted in accordance with the treatment time, concentration of the solution and reaction temperature.

The surface hardness of the sample after the pickling treatment or the anodizing treatment was measured. In case of an alloy of Fe and Cr, the surface hardness of less than Brinell hardness 16.1 were enhanced to about 43 to 49 Bhn through the surface treatments. In case of the alloy of Al (alloy number 2024), the surface hardness is about 47 Bhn. In other words, the surface which is high in hardness was formed on the screen.

The surface hardness of the screen of the present invention is enhanced by about 20 times compared to that of the conventional screen formed with silver foil plastic. As a result, the screen may be cleaned using water with high pressure in set condition of the screen. In addition, the surface hardening process polishes finely the surface of the screen base (1) to reduce the speckle phenomenon, and so high quality of the image is displayed on the screen.

From the preferred embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

Industrial Applicability

As described above, the screen of the present invention is formed with non-combustible material, and so poisonous gas is not generated in case of fire. Therefore, the screen is suitable for a public space such as a subway, a school or government and public offices, etc. and applicable to a screen for advertisement in large size space such as a large conventional hall, an underground shopping center or a department and so on.

In addition, the metal employed as the screen base has transparent and silver-white color. Thus, a projected image may be displayed on the screen with original color and an image having high contrast may be displayed on the screen.

Also, left-right viewing angle is enlarged comparing to up-down viewing angle by the unidirectional polishing waves formed on the surface of the screen base. Hence, the left-right viewing angle of the screen of the present invention is enlarged by above 2 times compared to that of the conventional screen, wherein the brightness of the screen of the present invention is substantially identical to that of the conventional screen. Furthermore, the image can be clearly displayed on the screen even in a bright space.

Additionally, the surface of the screen of the present invention has great hardness and the screen is strong in change of temperature and wind pressure. Therefore, the screen may be employed in outdoor such as a playground or a roadside and so on.

In addition, the pickling treatment and the anodizing treatment are performed on the surface on which the polishing waves are formed so that the hardness of the screen is enhanced.

In addition, the screen of the present invention is a surface reflection type screen so as to reproduce very clear images by reflecting directly images from a light source.

In addition, a large screen can be manufactured by combining a plurality of the unit screens according to the present invention, which have a predetermined size. The edge portion of the unit screens are bended and polished perpendicularly so that the unit screens are combined with the polished edge portions contacted one another.

The invention claimed is:

1. A surface reflection type screen formed with a non-combustible metal comprising:
   a screen base formed with a incombustible metal sheet having silver-white color for displaying an image projected from a light source; and
   a polished surface formed on the screen base by polishing the screen base so that the surface of the screen base has a predetermined reflectivity of about 1 to 40 gains,
   wherein a surface hardening treatment is applied to the surface of the screen base; and
   wherein the screen base is formed into a plane, curved or spherical shape selectively in accordance with the reflectivity of the surface of the screen base so that a hotspot is removed from the screen.

2. The screen of claim 1, wherein the screen base is formed with an alloy sheet of iron (Fe) and chromium (Cr) or an alloy sheet of Fe, Cr and nickel (Ni), and a chromium trioxide ($Cr_2O_3$) film is formed on the surface of the screen base by a pickling treatment.

3. The screen of claim 1, wherein the screen base is formed with a metal sheet made of one of aluminum (Al), an alloy of Al and magnesium (Mg), and an alloy of Al and nickel (Ni), and an aluminum oxide ($Al_2O_3$) film is formed on the surface of the screen base by an anodizing treatment.

4. The screen of claim 1, wherein the reflection surface is formed on the surface of the screen base in one direction of the up-down direction or the left-right direction, the scattering surface is formed on the surface thereof in the other direction, and the surface thereof is polished so as to form an unidirectional polishing waves on the surface thereof.

5. The screen of claim 1, wherein the surface of the screen base is treated by porous chromium plating and a porous part of the surface of the screen base is filled with a colored paint.

6. A surface reflection type screen formed with a non-combustible metal comprising a screen base formed by arraying in sequence a plurality of circular metal wires,
   wherein the metal wires are formed of an alloy of iron (Fe) and chromium (Cr) or an alloy of Fe, Cr and nickel (Ni), and a chromium trioxide ($Cr_2O_3$) film is formed on the surface of the each metal wire by a pickling treatment.

7. A surface reflection type screen formed with a non-combustible metal comprising a screen base formed by arraying in sequence a plurality of circular metal wires, each one of the plurality of wires having a surface that when arrayed in sequence together form a surface of the screen base; and
   a wire grain formed by the sequential away of the wires functions as a scattering surface;
   wherein the metal wires are formed with an alloy of aluminum (Al) or an alloy of Al and magnesium (Mg), and an aluminum oxide ($Al_2O_3$) film is formed on the surface of the screen base by an anodizing treatment.

8. A method of manufacturing a surface reflection type screen formed with a non-combustible metal comprising:
   forming a metal sheet with a non-combustible metal having silver-white color for displaying an image projected from a light source;
   forming a polished surface on the metal sheet by polishing the surface of the metal sheet so that the surface of the metal sheet has a predetermined reflectivity of about 1 to 40 gains;

forming the metal sheet into one of a plane, curved and spherical shape in accordance with the reflectivity of the surface of the metal sheet so as to remove a hotspot; and implementing a surface hardening treatment on the surface of the metal sheet.

9. The method of claim 8, wherein the polished surface is formed by buffing, injection, etching, rolling or electrolytic polishing.

10. The method of claim 9, wherein the etching corrodes the metal sheet using film photosensitization so that a reflection surface and a scattering surface are simultaneously formed on the metal sheet.

11. The method of claim 9, wherein the injection injects a compressed air on the metal sheet to polish the surface of the metal sheet.

12. The method of claim 8, wherein the surface hardening treatment is selected out of a pickling treatment, an anodizing treatment and a plating method in accordance with the material of the metal sheet.

13. The method of claim 8, further including forming a plurality of holes on the metal sheet so that an air flow passes through the screen.

14. A method of manufacturing a surface reflection type screen formed with a non-combustible metal comprising:

forming metal wires having circular shape;

treating the surface of the metal wires using a pickling treatment or an anodizing treatment in accordance with material of the metal wires so as to form a passive film on the metal wires; and arraying in sequence the treated metal wires and combining the arrayed metal wires, and then forming the combined metal wires into a plane, curved or spherical shape of screen.

* * * * *